R. BAGGALEY.
METHOD OF SMELTING AND REFINING COPPER ORES AND COMPOUNDS.
APPLICATION FILED APR. 25, 1907. RENEWED OCT. 22, 1910.

977,996.

Patented Dec. 6, 1910.
14 SHEETS—SHEET 4.

R. BAGGALEY.
METHOD OF SMELTING AND REFINING COPPER ORES AND COMPOUNDS.
APPLICATION FILED APR. 25, 1907. RENEWED OCT. 22, 1910.

977,996.

Patented Dec. 6, 1910.
14 SHEETS—SHEET 6.

WITNESSES

INVENTOR

R. BAGGALEY.
METHOD OF SMELTING AND REFINING COPPER ORES AND COMPOUNDS.
APPLICATION FILED APR. 25, 1907. RENEWED OCT. 22, 1910.

977,996.

Patented Dec. 6, 1910.
14 SHEETS—SHEET 13.

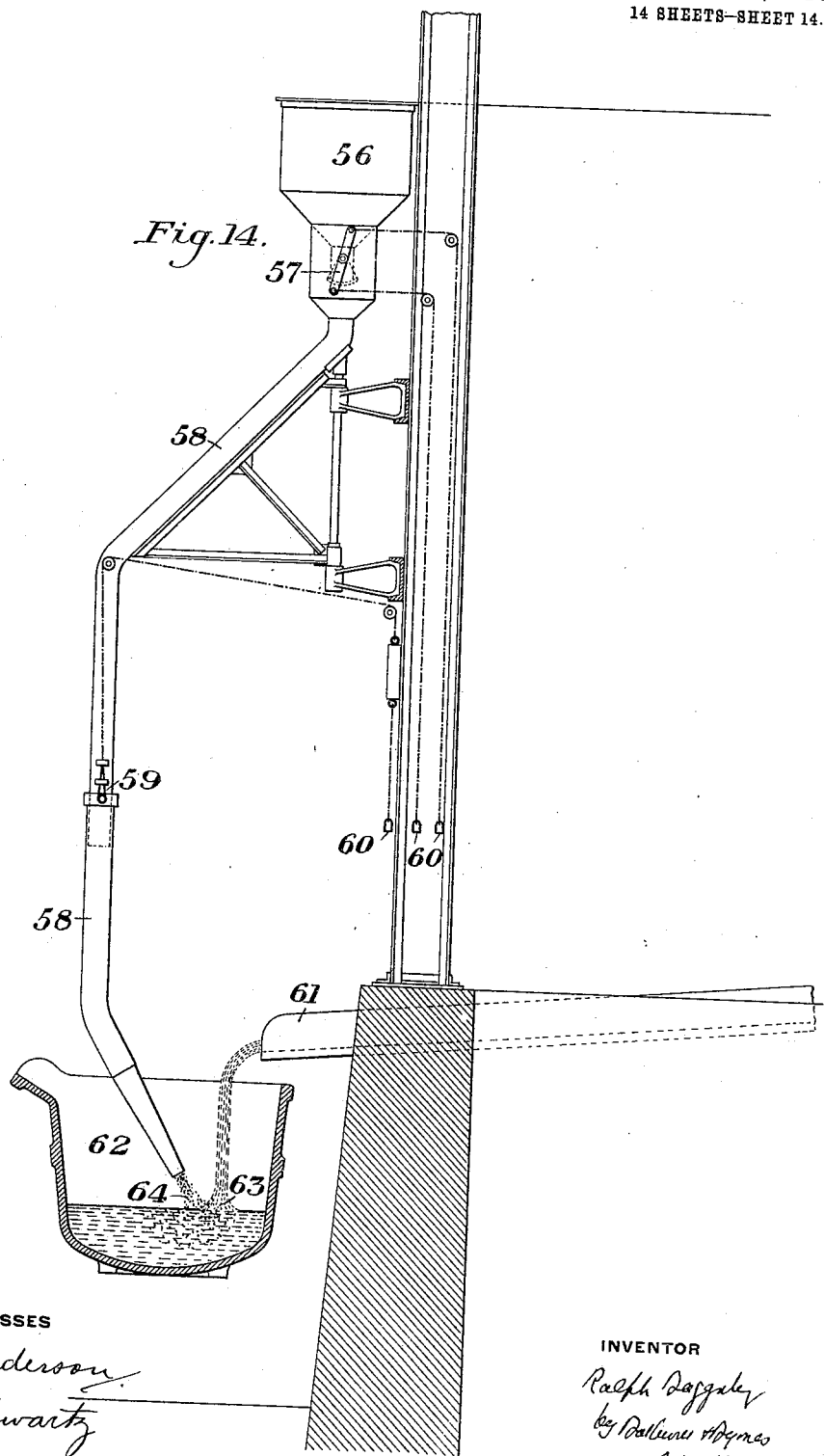

UNITED STATES PATENT OFFICE.

RALPH BAGGALEY, OF PITTSBURG, PENNSYLVANIA.

METHOD OF SMELTING AND REFINING COPPER ORES AND COMPOUNDS.

977,996.  Specification of Letters Patent.  Patented Dec. 6, 1910.

Application filed April 25, 1907, Serial No. 370,238. Renewed October 22, 1910. Serial No. 588,535.

*To all whom it may concern:*

Be it known that I, RALPH BAGGALEY, of Pittsburg, Allegheny county, Pennsylvania, have invented a new and useful Method of Smelting and Refining Copper Ores and Compounds, of which the following is a full, clear, and exact description, reference being had to the accompanying drawings, in which—

Figure 1:
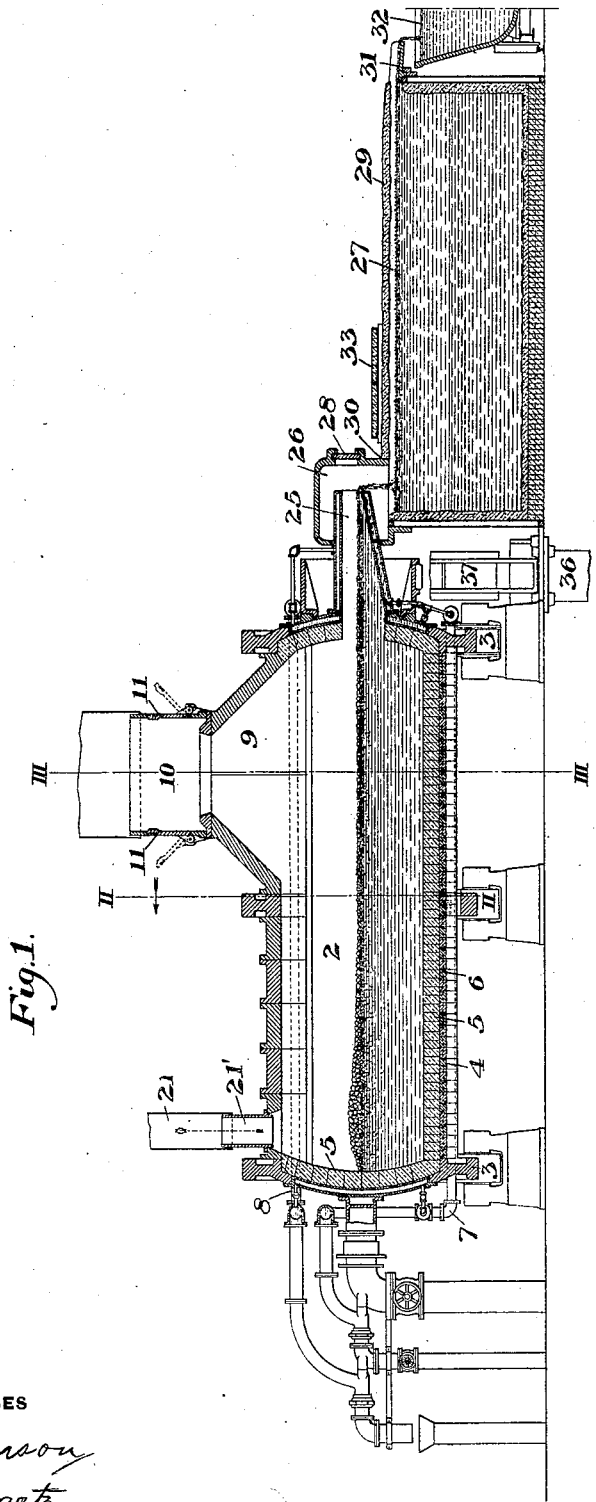
Figure 2:
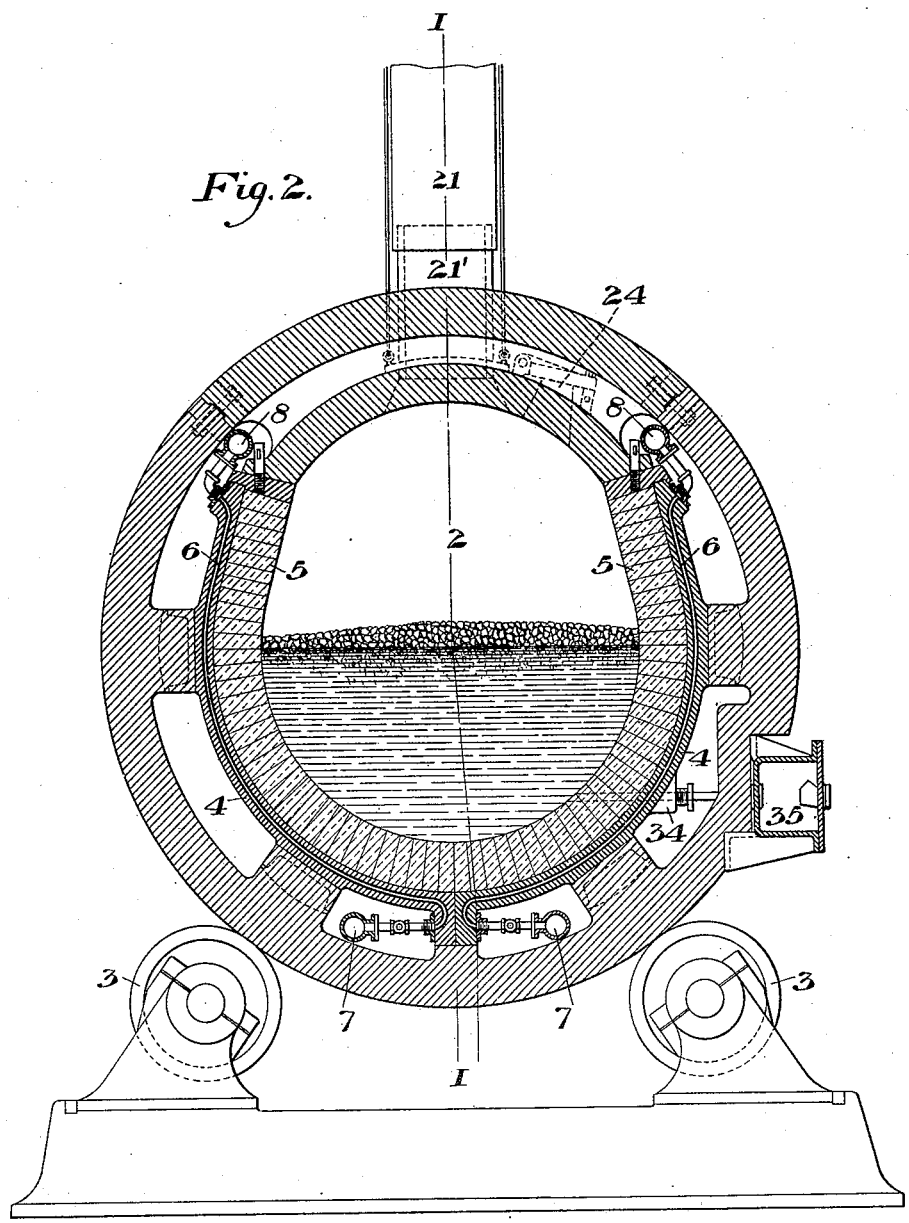
Figure 3:
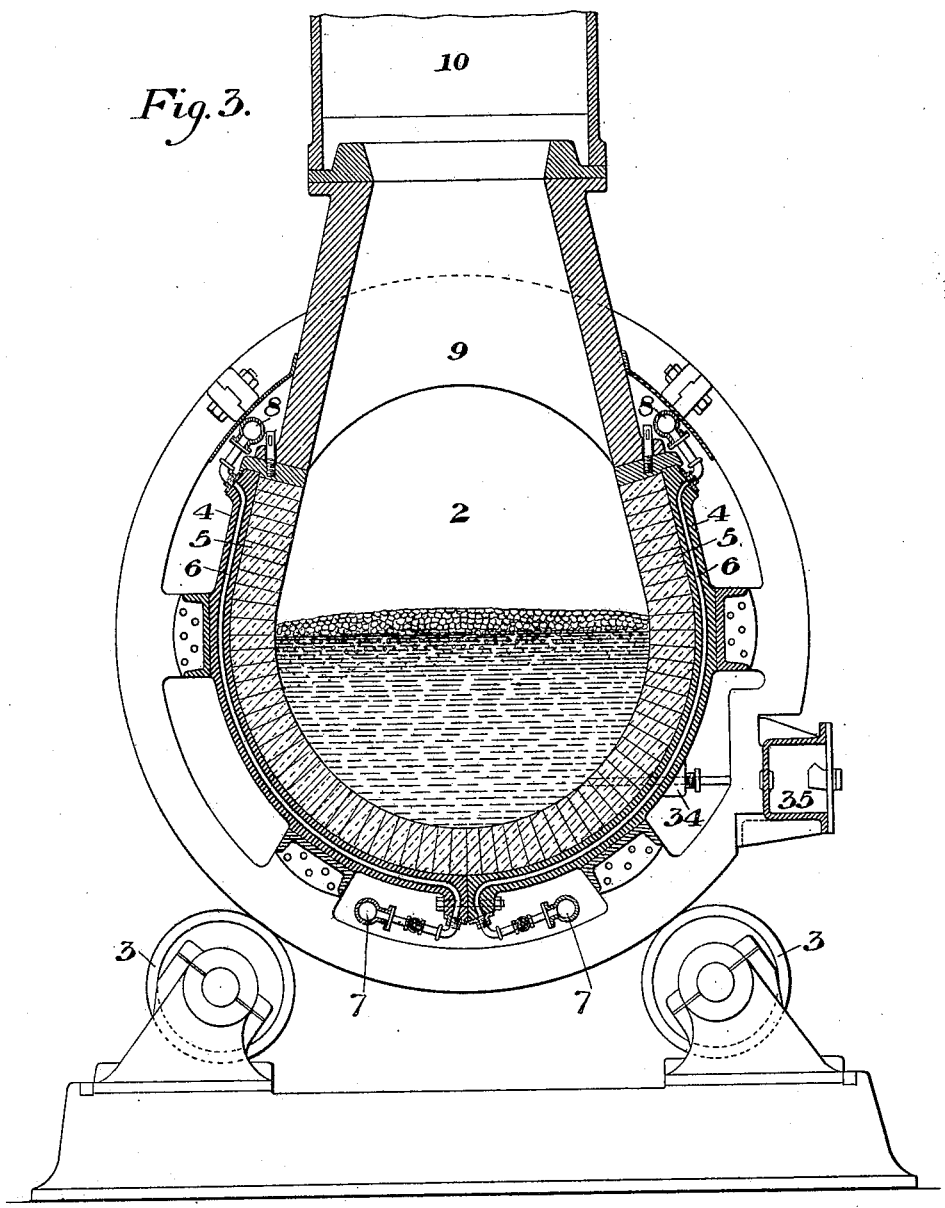
Figure 4:
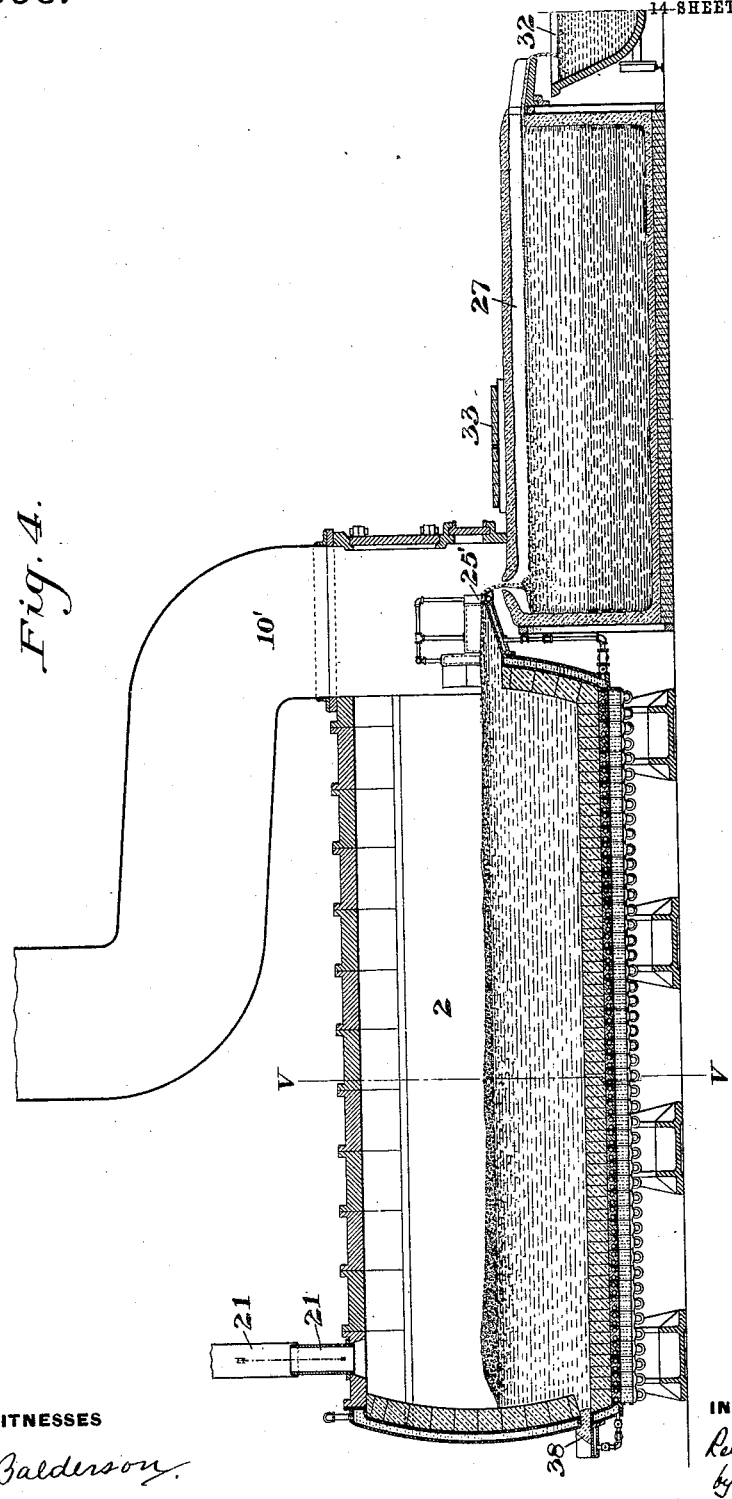
Figure 5:
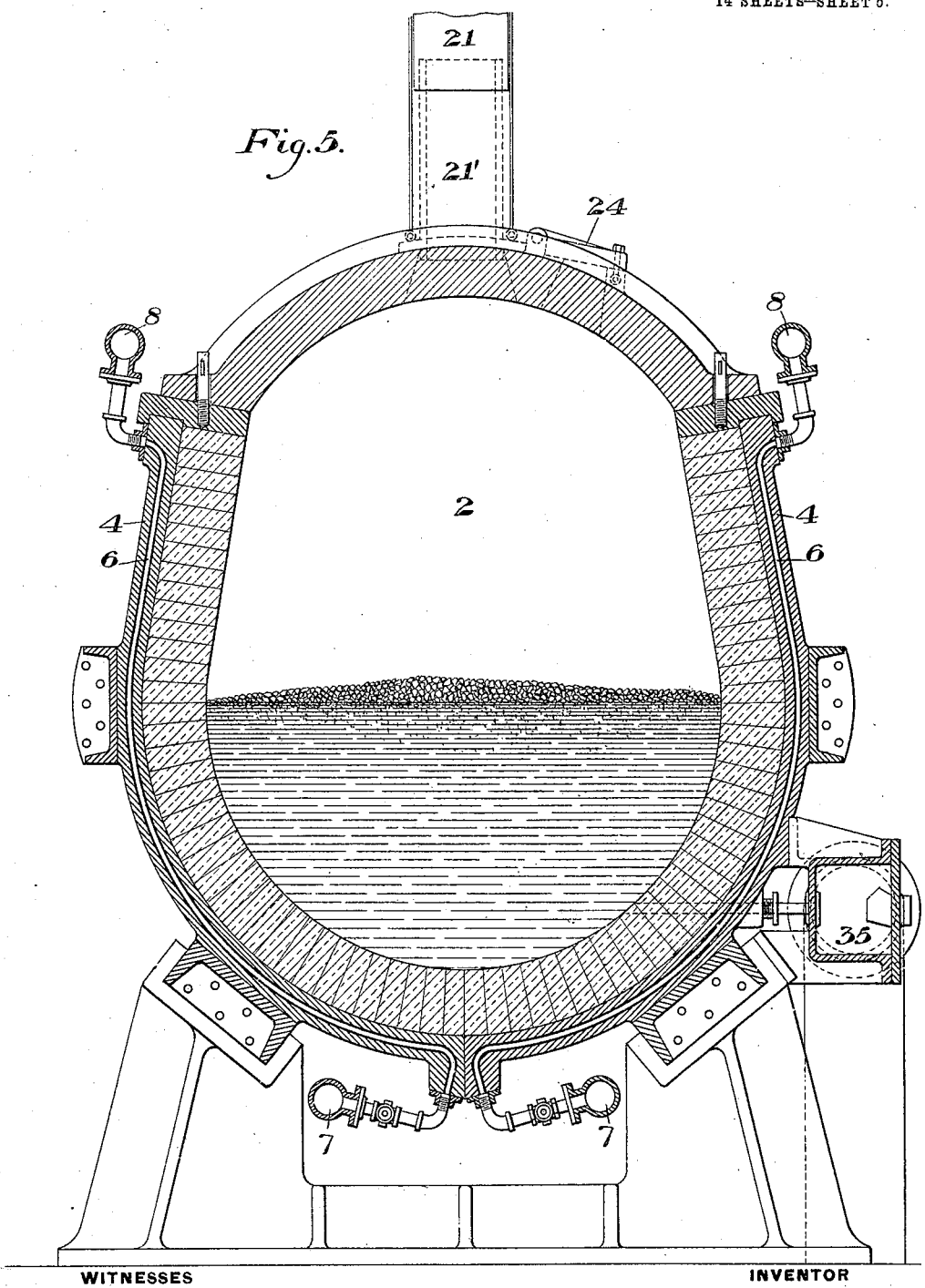
Figure 6:
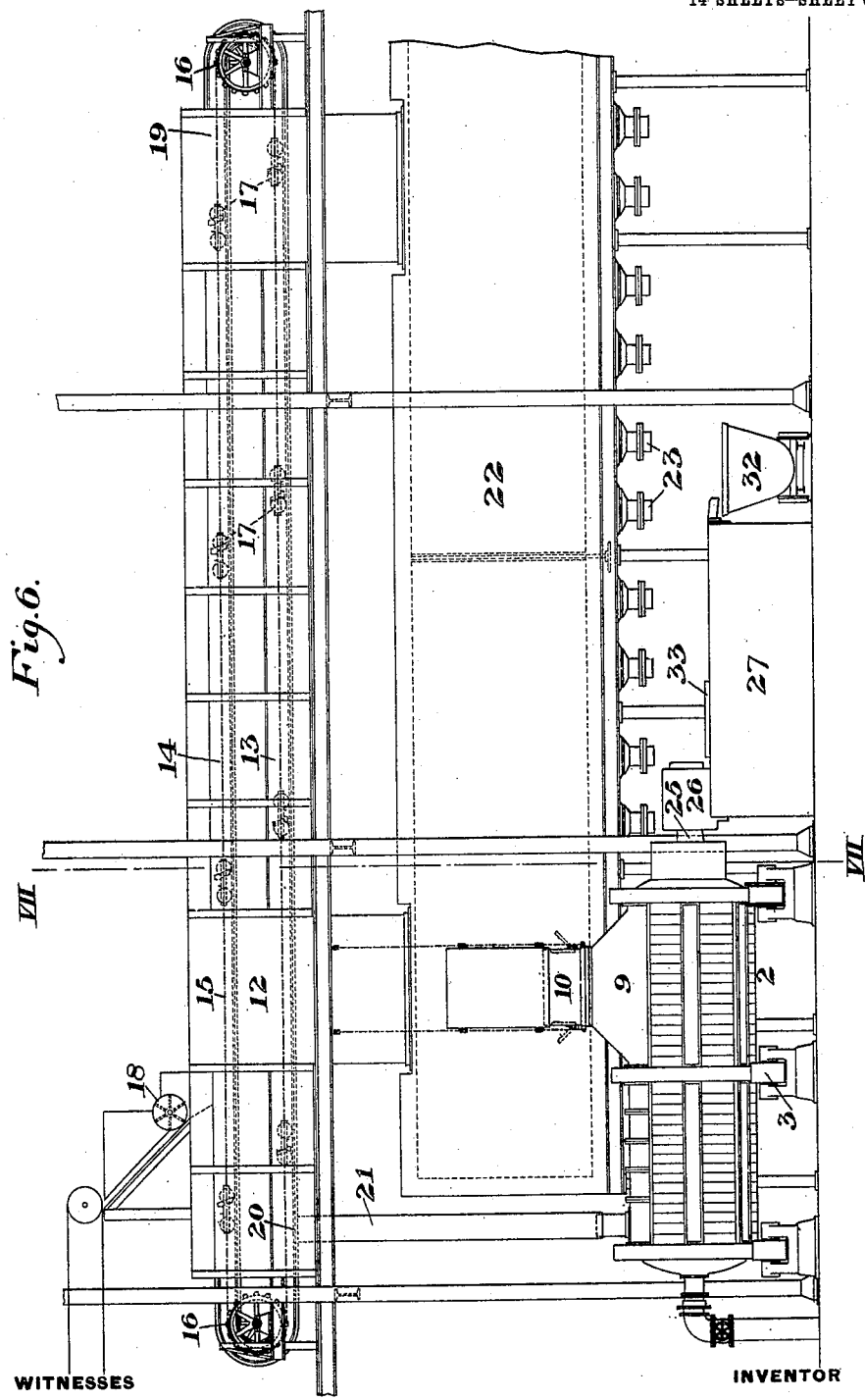
Figure 7:
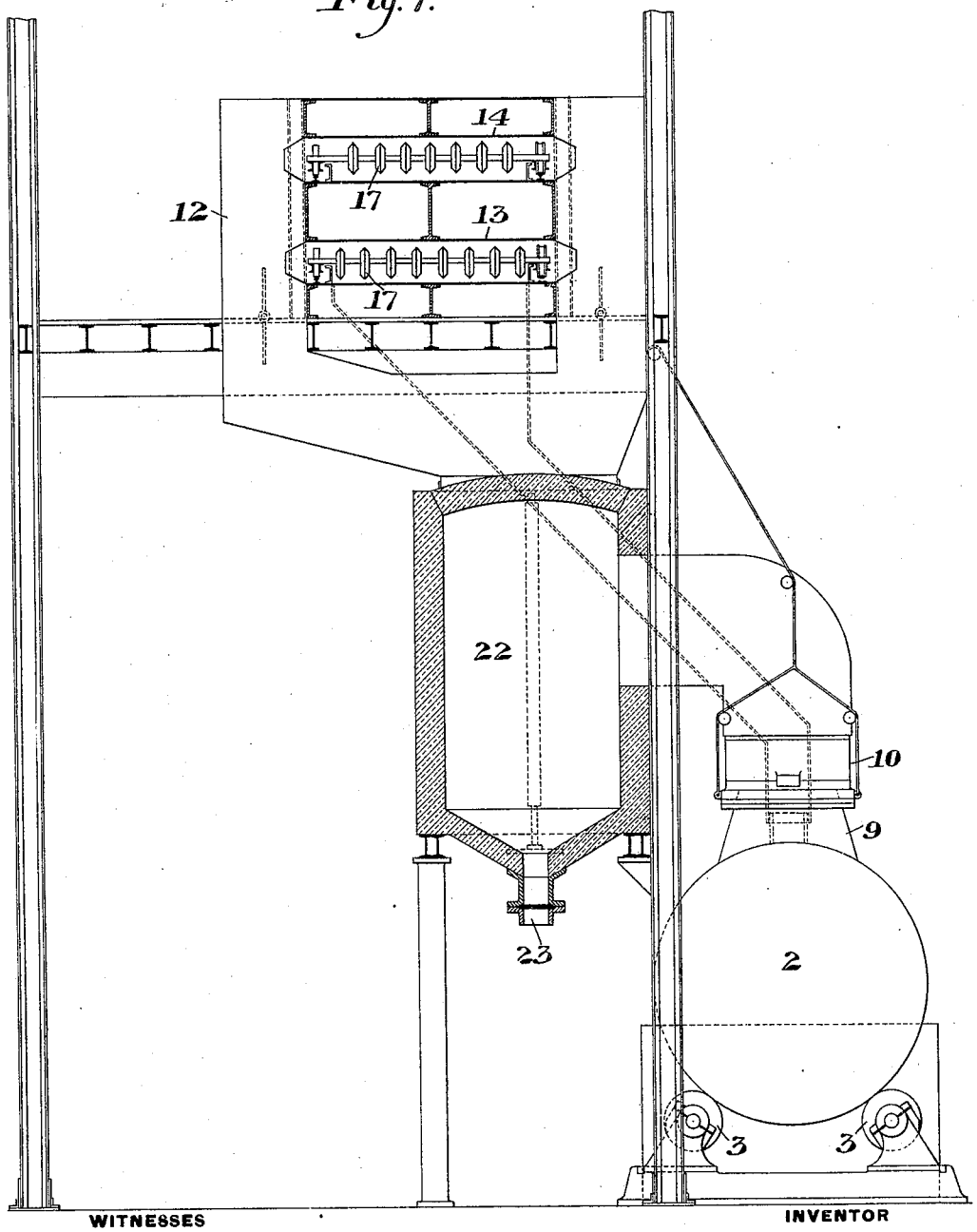
Figure 8:
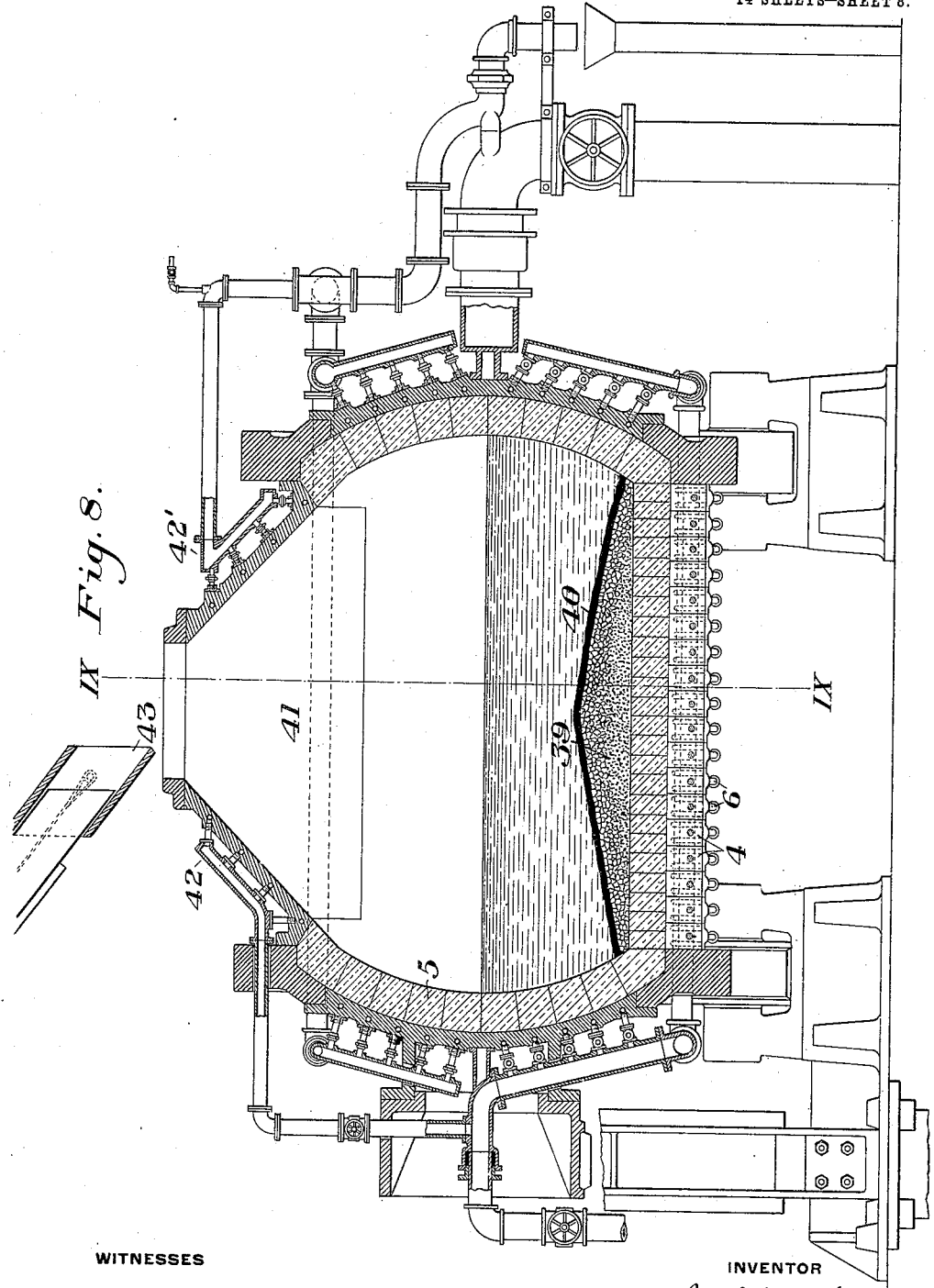
Figure 9:
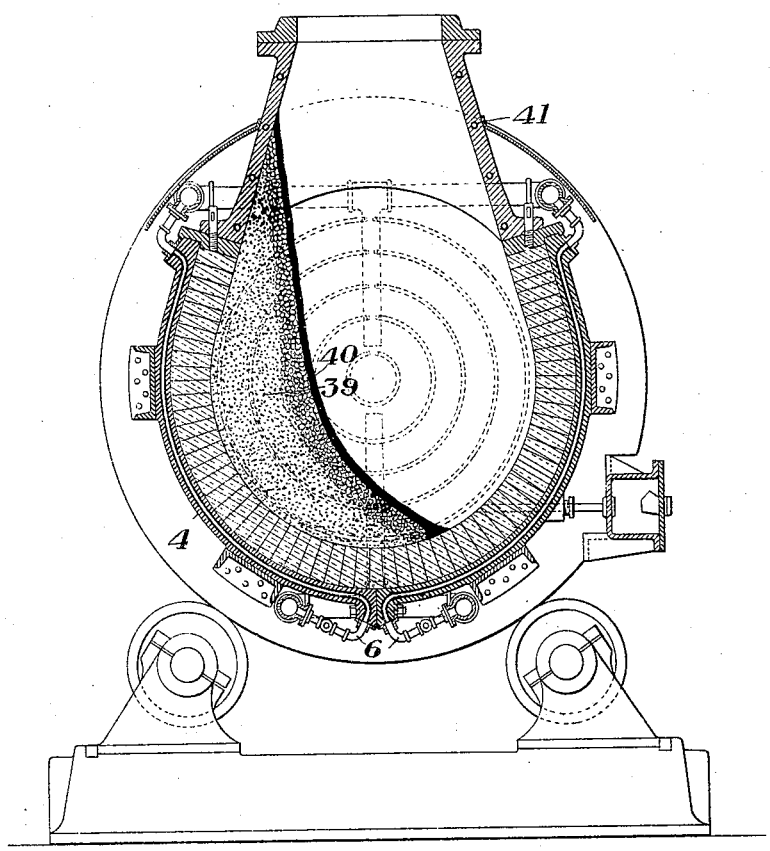
Figure 10:
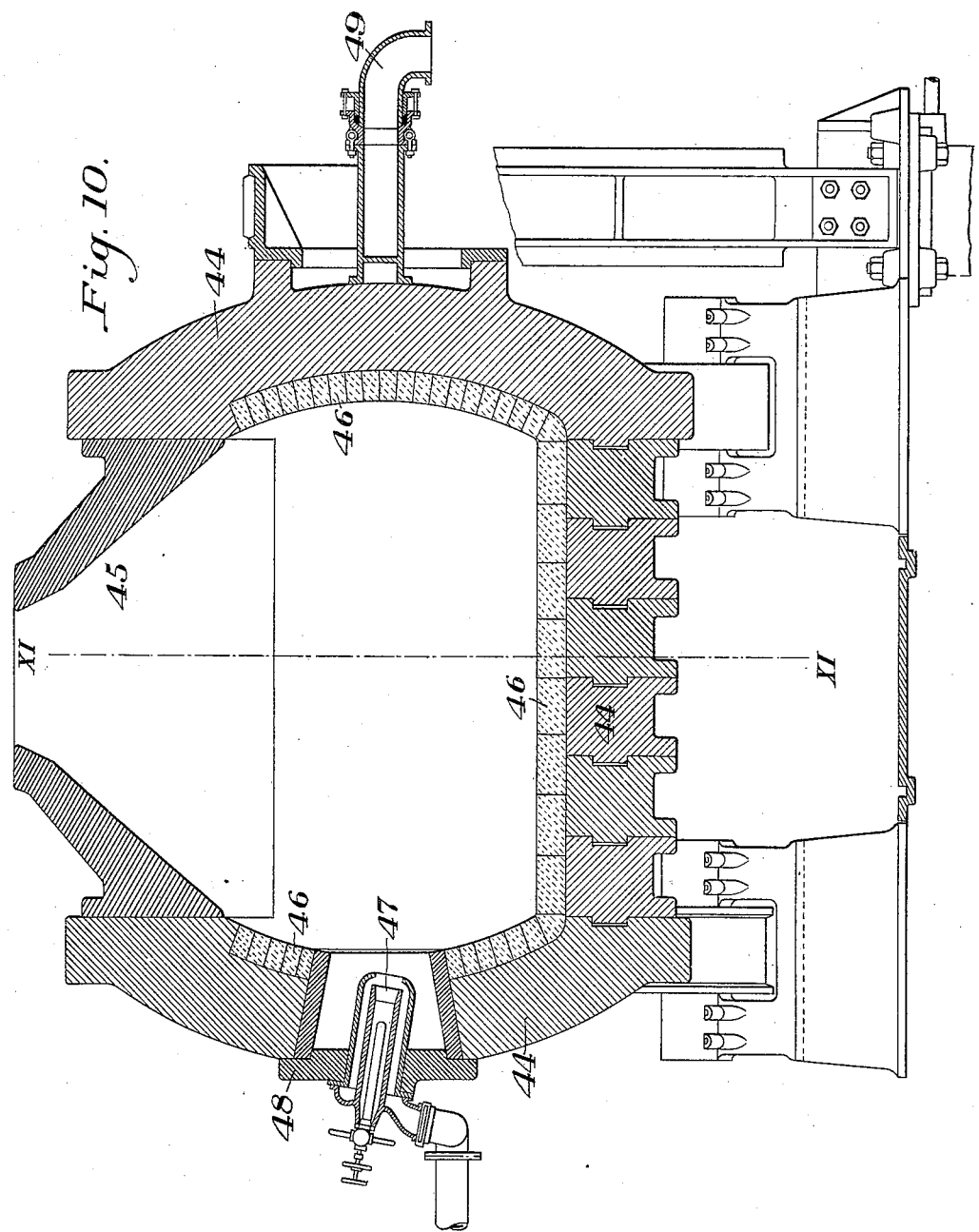
Figure 11:
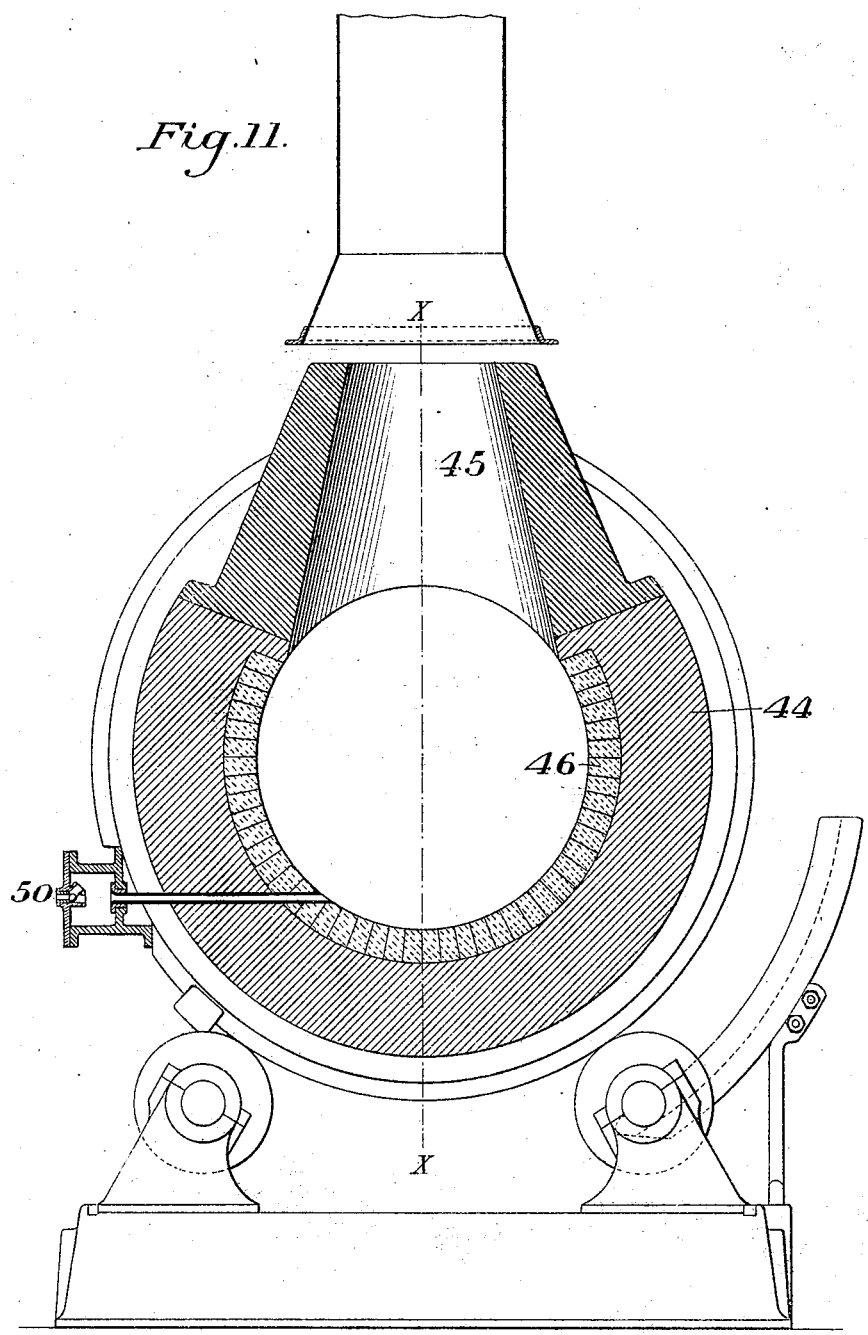
Figure 12:
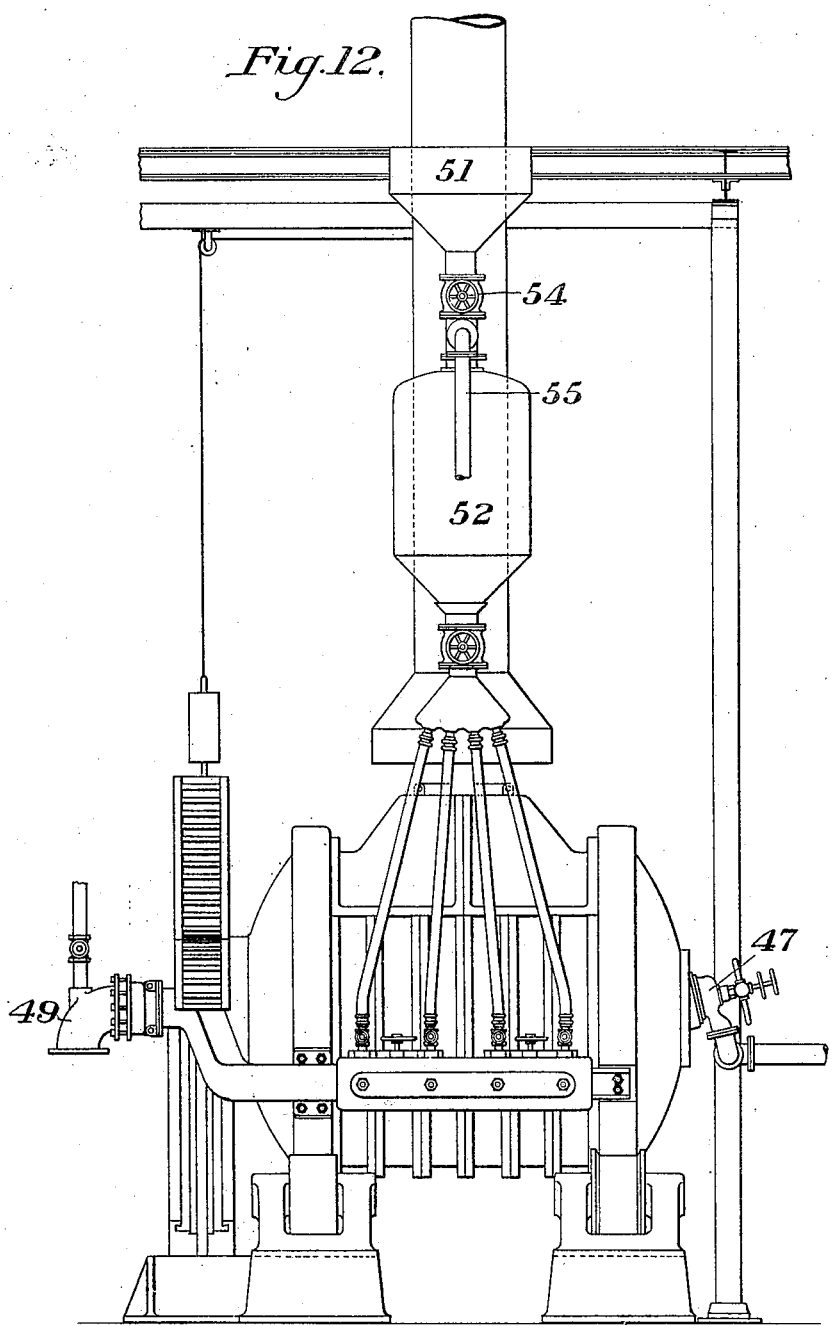
Figure 13:
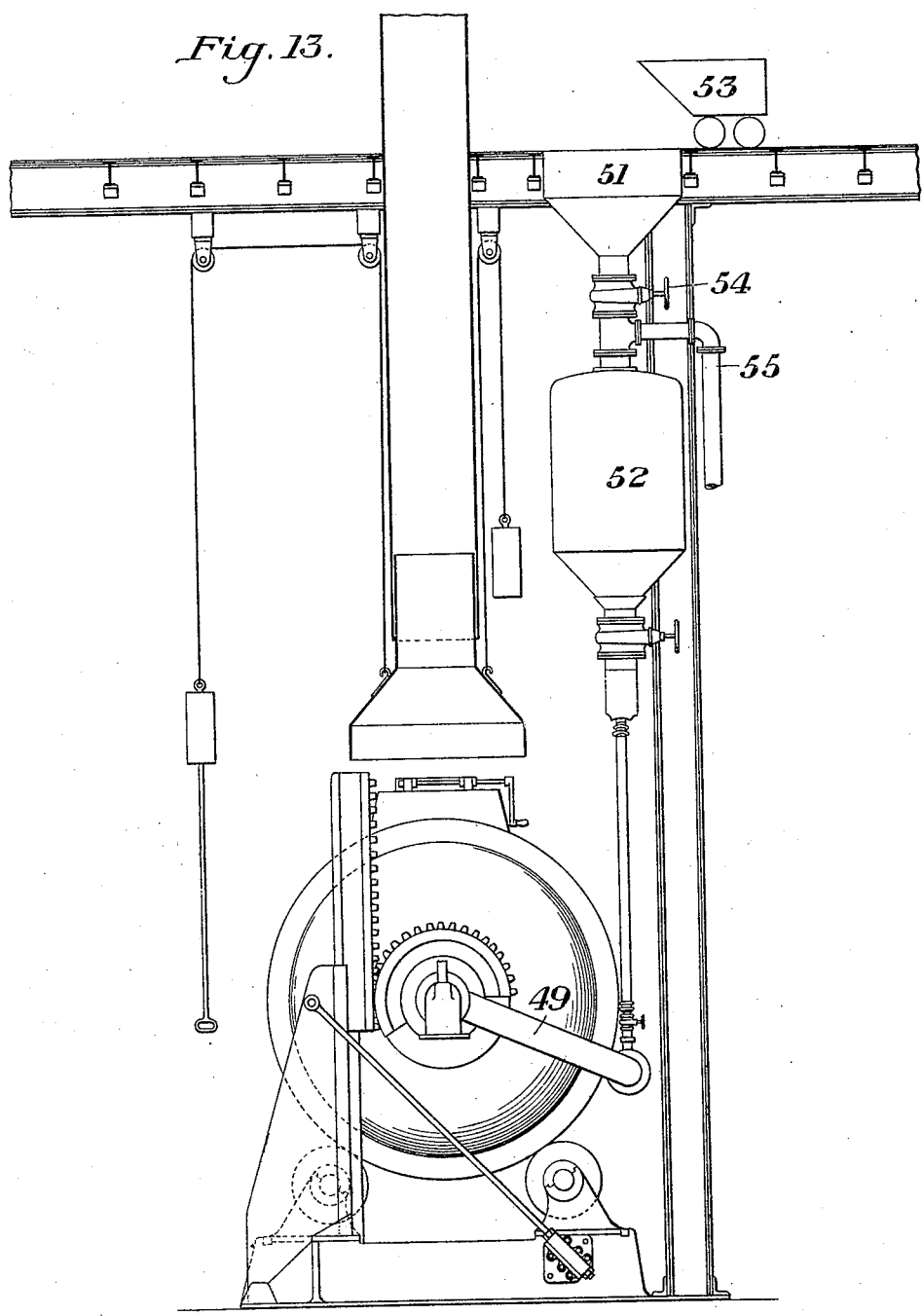

Figure 1 represents a longitudinal cross-section of my primary converter for eliminating metalloids, performing in this respect the function of a blast furnace for the treatment, without carbonaceous fuel, of such ores as contain within themselves sufficient sulfur or other oxidizable elements and compounds, such as arsenids, antimonids, sulfids, &c., to produce the heat with which to conduct a continuous smelting operation. Fig. 1 also illustrates in longitudinal cross-section, a forehearth and inclosed drop tube, which exclude the outside air and thus prevent chilling the molten slag and matte; Fig. 2 is a cross-section on the line II—II of Fig. 1; Fig. 3 illustrates a cross-section on the line III—III of Fig. 1; Fig. 4 is an alternate form of my primary smelting converter, together with its forehearth. This alternate form may be used when it is preferred that such primary converter shall remain in a fixed position, or in other words, when it is not desired to rotate the vessel for the purpose of emptying the contents, should a stoppage from any cause become necessary. It is also useful in treating very refractory ores, which may demand a very long travel, while submerged in the molten bath of matte to dissolve them; Fig. 5 represents a cross-section on the line 5—5 of Fig. 4; Fig. 6 represents a side elevation of my rotatable primary smelting converter with its inclosed drop tube, forhearth and waste slag-car, in combination with one form of a preheater. The latter is intended to expel moisture from the ore-feed and to preheat the ores to a degree less than the fusion point of the contained sulfid, arsenids, antimonids, &c., by means of the waste hot gases that constantly escape from the nose of the vessel while ores are being smelted in it; Fig. 7 represents a cross-section of Fig. 6. It illustrates the method of drying and preheating the ore, or if preferred, of discharging the hot gases emanating from the process, directly into the dust chambers, flue and stack, without first passing the same through the preheater; Fig. 8 illustrates a longitudinal cross-section of my secondary or iron eliminating converter. The vessel is shown with a water-cooled, solid metal top or throat, in order to illustrate various forms of construction; Fig. 9 represents a cross-section of Fig. 8; Fig. 10 illustrates a longitudinal cross-section of my preferred form of copper refining furnace; Fig. 11 illustrates a cross-section on the line XI, XI of Fig. 10; Fig. 12 illustrates a front elevation of Fig. 10, showing means for injecting saw-dust or other gas-producing media; Fig. 13 illustrates an end view of Fig. 12; Fig. 14 illustrates my preferred method of recovering mineral values from fines and flue-dust, by mingling these with low grade molten matte before the same is placed in the secondary converter for bessemerizing.

I have considered it unnecessary to include in these illustrations a copper blast furnace or cupola for the melting of ores containing less than 56 per cent. of oxidizable elements and compounds, or in other words, for the first fusion of such ores as demand that certain percentages of coke be added to supply the deficiency of natural fuels contained in the ores themselves, in order to successfully subject them to a simple melting for the elimination of the silica, alumina, lime or other metalloids. Any of the ordinary forms of copper blast furnace or cupola in general use may be utilized for this purpose.

Ores as usually found in nature contain an enormous proportion of waste and a comparatively minute percentage of mineral. A 2% copper ore, for instance, which is about the present limit of possible profitable extraction, when the values are not in the form of virgin copper, contains 40 pounds of valuable mineral and 1960 pounds of waste per ton. The problem is to separate the one from the other quickly, cheaply and with minimum losses. All processes of separation, whether by water, oil, air or smelting, are attempts to do this.

When highly silicious Butte ores are smelted they demand the addition of large percentages of non-mineral bearing fluxes principally in the form of lime and iron, to make this separation possible. Such additions have the effect of greatly increasing the consumption of coke and they double the volume—hence the mineral losses in the slag. When such ores are crushed and concentrated by water, oil or air, the mineral losses are excessive. These generally amount to one-third of the total mineral contents.

All present methods of extracting the mineral values from copper, gold and silver ores include some one of these various forms of concentration; such, for instance, as water concentration, or where the ores cannot be crushed and concentrated, owing to their physical condition, they are usually roasted in open roast heaps or in stalls, and they are thereafter subjected to smelting in blast furnaces with heavy percentages of lime and coke in order to produce what is called in the trade "converter matte;" or in other words, a matte containing about 50 per cent. of copper. Such matte is thereafter bessemerized in vessels containing heavy bodies of crushed silica, in the form of a lining, which, through its corrosion and destruction, is depended upon to unite with the iron, after oxidation, in the matte and thus pass off in the form of silicate of iron slags.

All present processes of recovery are expensive and are extremely wasteful of the minerals contained in the ore. The records for many years past in the Lake Superior district show that in the water concentration process alone, ores containing primarily 3 per cent. of copper, only yield, after water concentration, 2 per cent. In other words, one-third of the entire mineral contents is lost in this single process. In the Butte district of Montana, the loss of mineral has averaged more than one-third.

The object of my present invention is to provide an entirely new method of extracting the mineral values of copper, gold and silver ores— *a*. Without the cost of a water-supply and of a water concentration plant. *b*. Without the enormous percentages of mineral loss that now prevail in all water concentration and other processes. *c*. Without the mineral loss that experts know results from all forms of heap or stall or other roasting. *d*. Without the cost of coke or other carbonaceous fuel in some cases, and with less than one-half present costs, in others. *e*. With less than one-fifth the slag loss that prevails in any present form of smelter practice. *f*. Without the present excessive mineral loss that results from saturation in furnace bottoms and side-walls. *g*. Without the fuel and labor costs of remelting an excessive proportion of congealed converter slag and smelter scrap. *h*. Without creating the present poisonous tailings nuisance, that has been found to be so injurious to land and to water in the vicinity of ore treatment plants. *i*. Without creating more than a small proportion of the present sulfur and arsenic fumes nuisance, that is so objectionable to agricultural interests for many miles around all copper smelting plants. *j*. Without requiring more than five hours in which to produce good blister copper out of ores, where 100 hours is now the average in present practice. *k*. Without requiring an investment of more than one-fifth that demanded by all present practice in treating the same tonnage. *l*. That renders available and commercially valuable large bodies of low grade ores that are relatively low in copper or in precious metals, yet which contain ample percentages of natural fuel, principally in the form of sulfid, for their own refining. Enormous tonnages of such ores exist on the island of Newfoundland and elsewhere, yet these great deposits are not and cannot be commercially worked by any present process, excepting that described in my present invention.

The enormous advantage of this process, when viewed as a whole, over any existing process, to accomplish the same results of extracting copper, gold and silver from their ores may be best shown by the approximate cost of each.

The cost of producing copper by all present processes may safely be said to average more than 9 cents per pound. With my present process it is safe to say that in treating ores that contain the requisite percentages of natural fuels, that is to say, oxidizable elements and compounds in excess of 56 per cent., that copper can be thus produced at one-half the cost of present practice at all the present plants, whatever the same may on test prove to be, at each. With ores that are deficient in natural fuels and which contain less than 56 per cent. of total oxidizable elements and compounds, so that coke or other carbonaceous fuel must be added to a greater or less degree, governed by the amount of natural fuel in the ores themselves, and which additions must be made of carbonaceous fuel in order to maintain a successful smelting process, then the difference in cost is not and cannot be so great, because in this first fusion a blast furnace must be used, with at least some of its wastefulness and its objectionable features. In this event, however, it is safe to state that copper by my process can then be produced at two-thirds the cost of present practice, or for less, according to the percentages of coke that must be added to the ores, in order to supply the deficiency in their natural fuels.

In treating ores by this process they must of necessity be divided into two great and radically different classes, to wit:

First. Those that contain sufficient natural fuel within themselves to make their treatment by smelting with it alone possible. In this class are included all those that contain in excess of say 56 per cent. of total oxidizable elements and compounds such as sulfur, iron in the sulfur form, arsenids, antimonids, &c. When a blast of air is driven into any or all of these while in the molten form, heat results from their transition from the primary into the ultimate or oxid form. Everything on the crust of the earth that is not already an oxid is undergoing continuous oxidation through the processes of nature and through the action of the oxygen contained in the air and in the meteoric or surface waters. If a piece of steel or iron, although it is already an oxid in one of its forms, be exposed to the weather, it may demand ten years to be transformed into rust, or in other words into its final oxid form. This transition produces heat to the same degree that it is produced if the same piece of iron or steel were oxidized with great rapidity. In the one case the oxidizing process is so slow that the heat generated is imperceptible. In the other it may be so rapid as to produce silver white incandescence. The ores referred to at Newfoundland; those found at Rio Tinto, in Spain; those at Tharsis, in Portugal; those at Mount Lyell, Tasmania, as well as many other important deposits in the world are all included in this class. Some of them contain as high as 70 per cent. or even more of total oxidizable elements and compounds. All such are capable of successful treatment by smelting, through the heats of oxidation alone, in my primary smelting or metalloid eliminating converter, and entirely without the addition of carbonaceous fuel of any kind. The efficiency of this primary converter and its smelting capacity will be materially increased by utilizing the hot gases emanating from the process, in drying and in preheating the ores before they are fed into the vessel. This preheating is not essential to success, from a purely metallurgical standpoint, as raw ores direct from the mines may be successfully smelted thus, without preheating. The effect of preheating is simply to increase the efficiency of the apparatus and to materially augment the tonnage of ore than can be dissolved or melted in it in a given time. For ores of this class, my preferred method of treating them in my primary smelting or metalloid eliminating converter, with its forehearth, may be described as follows: A bath of clean matte is used with which to start the process. It may be derived from melting ores in a cheap cupola and separator or from any other source. It is made preferably from a simple smelting (without any attempt at concentration) of such ores as are rich in sulfur, iron, &c. What are called Butte smelting ores, which contain 6 per cent. or more of copper, may be used because these are comparatively low in silica and high in various oxidizable elements and compounds. Concentrates, pyrrhotites and many sulfids, arsenids, and antimonids are suitable for the purpose. After the process has been started and the oxidizing blast has been turned on, the iron supply of the bath is thereafter continued indefinitely by feeding continuous charges of raw ores of this description. The character of the bath may be changed or regulated at will, by the kind of ores fed. Fuel ores will increase the heats and the iron contents. Silicious ores will flux off and reduce the percentage of iron and they will usually increase the valuable mineral contents. The latter will be governed by the contained values.

The primary converter is the equivalent of and is designed to supersede, while treating suitable ores, the ordinary copper blast furnace, and its ore charges are intended to correspond, the difference being that it does not require coke and non-mineral bearing fluxes and it does not create a reducing action during fusion. At the same time it will be recognized that its limitations must always be to such ores as contain within themselves sufficient natural fuel to make a continuous smelting process possible by the heats of oxidation alone.

The more basic the bath, the larger the proportion of highly silicious ores will it be possible to dissolve in it. After the primary converter has been thus charged the converting blast is turned on in great volume and the ore-feed is commenced. The latter may be continuous or intermittent, as preferred. The vessel is preferably 20 feet in length and 8 feet in diameter, and it is provided with say twenty-eight 1¼ inch twyers, if of the rotatable type, as illustrated in Figs. 1, 2 and 3. If it be of the fixed or alternate type, as illustrated in the drawings, it may be of greater length and the number of twyers should be increased according to its length.

Before entering the vessel, the ores are preferably passed through a preheater of some form; such, for instance, as that shown in the drawings, and the hot gases which continuously escape in enormous volume are utilized to preheat them, without cost for fuel, to a degree less than the fusion point of sulfids, arsenids or antimonids, or say, for instance, up to 700 degrees F. The heat may be utilized to the fullest extent without any cooling influence from an admixture of outside air, because this vessel remains continuously in its upright position so long as work in it progresses. This pre-heating, as before stated, has the effect of expelling all moisture and it heats the ores to an important extent. Each degree of heat thus added, without cost, materially augments the smelting capacity of the vessel in a given time. The ore charges enter the vessel at one end and they float slowly toward the opposite end while subjected to the intensely corrosive action of a low grade, basic matte and to the intense heats produced by an enormous air blast acting upon a low grade bath. The ores are thus quickly dissolved or melted, without carbonaceous fuel. Inasmuch as they are thus dropped instantly into the smelting temperature which always exists in the bath and above it in the vessel and which must always exist so long as the bath remains molten, the sulfids, arsenids, antimonids and other fuels contained in the ores are liberated and are forced to join the matte, without volatilization; hence they become available as heat producers in continuing the smelting process. Careful tests have proved that a continuous temperature in excess of 2000 degrees F. is demanded in order to maintain a bath of 10 per cent. copper matte in a molten, or in other words, in a liquid condition.

A great excess of silicious ore may be fed into this primary smelting converter, if desired, beyond the proportion that can be fused and that will form selective slags. The mineral values contained in these are extracted by liquation and they join the molten bath of matte. The clean silica shells float away and pass off with the worthless slag. Such separation by liquation is found to be exceptionally clean. Any occluded particles of mineral will be fused and join the molten bath at or about 700 degrees C. During their sojourn in the primary smelting converter, ores are continually subjected to temperatures in excess of 1300 degrees C. The silica will fuse and form selective silicate of iron slags in suitable proportion to the iron that exists in the bath. Any excess will remain unfused and will yield up its values through liquation alone, as stated.

Should it be found in practice that slags become sticky or pasty, either from a temporary excess of heat sufficient to cause a temporary excess of molten silica in the bath, from an excess of zinc, or from any other cause, limestone may temporarily or continuously be fed either into the primary or into the secondary converter. I much prefer, for this purpose, the temporary feeding of fluorspar; because I have found in practice that a relatively small proportion of it will at once liquefy the slag and remove any tendency to pastiness to a most astonishing degree. I would also call attention to the fact that in the primary smelting converter, I have found that zinc does not create thick, pasty slags, as is so common in blast furnace work. In the latter it has been found that 5 or 7 per cent. of zinc represents about the maximum limit that can be successfully worked, whereas in the smelting converter, ores containing 20 per cent. can be easily and successfully treated. The reason for this I have found to be that in the smelting converter much the greater proportion of the zinc is oxidized or volatilized and passes off in the form of hot gases, so that only a small proportion of it remains in the slag. This explanation will account for the great difference in percentages that may be successfully worked in the two processes of fusion.

The primary converter, at the end opposite to the ore-feed, is provided with a water-jacketed, untrapped overflow-spout in its axis. As the smelting progresses, matte, slag and unfused silica ore shells constantly overflow, the same as from a copper blast furnace. These together drop into a forehearth or separating vessel that is preferably 20 feet in length and say 10 feet in width, where an exceptionally clean separation occurs. The matte constantly accumulates at the bottom of the forehearth. It is not desired that this shall exceed a grade of about 15 per cent., in ordinary practice. It may be raised or lowered to harmonize with special conditions.

The worthless slag overflows quickly and continuously from the converter into the forehearth and from the forehearth it overflows continuously and passes direct to the dump. It is essential to success in this form of smelting ores by dissolving them in matte that the surface of the matte body be kept at all times clean and free from floating slag, so that the entering ore feed can drop into and instantly become submerged in clean matte. In this apparatus the overflow-spout is always open, free and untrapped. No floating body of slag can, therefore, accumulate as it does in a blast furnace with a trapped spout. On the contrary, the floating slag passes off quickly and the matte bath remains clean. In the forehearth the slag is always discharged from a body of very low grade matte.

It will be noted that in this primary or metalloid eliminating converter practically all of the silica, alumina, lime and other metalloids are at once separated and passed to the slag dump, with absolutely minimum mineral losses. The product consists of practically pure iron, copper, gold, silver and sulfur. In other words, the metals that it is desired to recover remain associated with a certain percentage of iron and sulfur, which together usually approximate 15 per cent. of the total tonnage of ore, while at this one point 85 per cent. of the total ore tonnage is usually at once discharged to the dump, at a minimum cost and with minimum mineral losses.

Particular attention is called to the fact that this process eliminates the poisonous tailings nuisance, that has been the cause of damage in agricultural districts. The water concentration process is not used and the slags produced are not objectionable. A more important item, however, is the mitigation of the nuisance of sulfur and arsenic fumes by this process. When ores containing sulfur and arsenic are fed into a blast furnace and travel slowly downward from the level of the charging-floor to the twyer zone, or in other words, to the only point in the blast furnace where it is possible to melt them, they become gradually heated. The distance varies in different forms of furnace, say from 9 to 16 feet, and during all of this time the sulfur and arsenic are being expelled, at least one-half of which is in the free state, so that they pass out of the stack in the form of gases $SO_2$, $SO_3$ and are then precipitated upon agricultural districts for twenty miles around the smelter plant. Inasmuch as the ordinary copper smelter plant thus ejects for subsequent deposition on the farm lands of the district from 200 to 600 tons of sulfur every twenty-four hours, according to the smelting capacity, the magnitude of this offense will be understood and reasonable people cannot find much fault with ranchers and farmers for pursuing litigation and for obtaining injunctions, as has been the case within the past two or three years. The wonder is, to disinterested people, that more injunctions have not already been obtained. The sulfur is volatilized and passes out of the stack in the form of gases, as soon as the ores reach a temperature in the blast furnace of about 700 degrees C. The ores cannot be melted, so that the matte can absorb the sulfur until a temperature of more than 1190 degrees C. has been reached. This temperature cannot be produced in a blast furnace excepting only in the twyer zone. Long before the ores reach this point in the furnace most of the sulfur has passed out of the stack in the form of gas.

In my method of smelting ores containing very high percentages of sulfur, in the primary converter, the fact is emphasized that all the heats utilized in the smelting process are obtained solely from the absolute combustion of the sulfur and of all other oxidizable elements and compounds contained in the ores or in the matte. This combustion occurs within the vessel itself, otherwise the heats would be useless for smelting purposes. The heats that are produced and that are continuously maintained in this process of smelting are at a silver white incandescence and represent about 2300 degrees F. Owing to these high heats, the combustion within the vessel is at all times very thorough.

Second. Those ores that contain less than 56 per cent of sulfids, arsenids, and antimonids or oxidizable elements and compounds of any kind; hence those that demand an addition of carbonaceous fuel, as a means of providing sufficient heat with which to smelt them.

It is not pretended by me that I am able to smelt ores without fuel of some kind; but where the ores within themselves contain sufficient natural fuels, I utilize these in this process and I have found that under these conditions it is unnecessary to add carbonaceous fuel of any kind in order to maintain indefinitely a successful smelting process. Where ores do not contain sufficient natural fuel within themselves with which to smelt them, I then supply only enough carbonaceous fuel to make up such deficiency. This added fuel cannot be handled to advantage in my primary or smelting converter, and as a consequence, in the first fusion with all ores that contain less than 56 per cent. of total oxidizable elements and compounds, I am compelled to utilize a blast furnace, excepting with say 10 or 15 per cent. of such ores, as will be hereinafter described and which are dissolved in the secondary converter. My method in this process of treating ores in the blast furnace is radically different from that which has prevailed in all past practice. I add only enough coke to make up the deficiency of natural fuels, as stated, and the sole object of this first fusion is for the purpose of eliminating the silica, lime, alumina or other metalloids. No attempt whatever is made at concentration, beyond what naturally results from a simple melting of the ores, to accomplish the elimination of the metalloids alone, as stated.

Where, in present and past blast furnace practice, 18 or 20 per cent. of coke has been found necessary in treating Butte and many other ores, supplemented by water concentration and roasting in heaps, in stalls or roasters, in order to produce a 50 per cent. converter matte, I avoid the expenses and the mineral losses of all crushing, all forms of concentration and roasting, as well as the use of about one-half of the coke in the blast furnace. In lieu of all this, I subject about 90 per cent. of the entire ore tonnage produced from the mines, of whatever grade it may prove to be, and usually not exceeding $3\frac{1}{2}$ per cent. of copper, to a simple melting in the blast furnace. I use for this purpose only 7 or 8 per cent. of coke and never more than 10 per cent.; or in other words, less than one-half the amount that is now used in general practice. The percentage of coke thus used in my process will be governed by the percentages of natural fuels contained in the ores under treatment. This first fusion or simple melting (without any attempt at concentration) results in the accumulation in the forehearth of a body of matte that usually varies from 15 to 25 per cent. in copper. This percentage, of course, will be governed absolutely by the mineral contents of the ores. I pay no regard to the mineral contents of the matte. From a purely metallurgical standpoint it may be anything from 3 per cent. to 30 per cent. The richer the ores under treatment and the higher as a consequence the mineral contents of the resultant matte, the better will be the commercial results. The point that I wish to particularly emphasize, as a means of showing that this process of smelting in a blast furnace is radically and fundamentally different from all past practice, and that it is in effect an absolute reversal of all past practice, is that in this first fusion I do not attempt or desire any concentration beyond what results from a simple melting of the ores, solely as a means of eliminating the worthless metalloids. In all other smelting practice, concentration is desired and is attempted to the utmost degree, at each and every step. The question naturally arises: When others desire such concentration in this first fusion, why do I seek to avoid it in this process? The answer is simple: Concentration means an increased loss of iron in the matte. I wish to retain in my matte every unit of iron that it is possible for me to retain, because each unit of iron thus saved means an increased amount of mineral bearing, profitable ore that can be melted, without cost, in the secondary stage of this process. This, then, is one object in producing a low grade matte, or in other words, a matte that contains heavy percentages of iron, which I have found in practice usually is about 67 per cent. As before stated, the sole object of this first fusion, whether the same be accomplished in the primary or smelting converter, while treating ores that contain ample percentages of natural fuel for their own reduction, or whether treating in a blast furnace ores that are so deficient in natural fuels that this deficiency must be made up in the form of coke, is to eliminate the silica, alumina, lime and other worthless metalloids. I have not considered it necessary to include in the drawings apparatus used in practicing this portion of the process, because any of the usual forms of blast furnace or cupola are suitable.

Either one or the other of the foregoing simple fusions, while treating ores of widely different character in radically different apparatus and at widely different costs, will result in approximately the same product. This is low grade matte, amounting generally to about 15 per cent. of the total ore tonnage, and it consists of the copper, gold and silver contained in the ores, together with a very large proportion of the total iron contents and with a large proportion of the sulfur.

It will be noted that approximately 85 per cent. of the total ore tonnage, or in other words, the metalloid contents of the ores under treatment, has been discharged to the dump, from the respective forehearths and from a body of very low grade matte, that rarely exceeds 20 per cent. of copper and as a rule is much less. In a continuous eight months' run of the Pittsmont smelter at Butte, I found that the mineral contents of this slag was usually the one-twentieth of one per cent. in copper. Sometimes it ran so low as to make it impossible to analyze by any of the ordinary methods. It never exceeded the one-tenth of one per cent. throughout our entire run. The average of all present practice may safely be stated to show a mineral loss in the slag of three-fourths of one per cent. It never averages less than forty-five hundredths of one per cent., and a large proportion of it is now running from 1 to 1½ per cent. Some of the old slag dumps at Butte, in Montana, are now being blasted out and mined for shipment to the Washoe smelter, for use as an iron flux, because oxidized iron vein outcrops are extremely scarce in that section. These slags contain from 1½ to 3¼ per cent. of copper and they illustrate past treatment losses, which show nearly as much copper in the slags as in the ores.

When it is remembered that in Butte practice approximately 50 per cent. of flux is used for the privilege of smelting 50 per cent. of mineral bearing ores, and that this flux makes slag in volume equal to that made by the ore, and that all such slag carries away to the waste dump an equal percentage of copper, it will be realized that present practice at Butte means a slag loss of nine-tenths of one per cent. of copper, or nearly one-third of the total copper contents of the ore, because the total ore product at Butte has averaged for many years past 3¼ per cent. in copper, and it is to-day said to average 3½ per cent. in copper, for the reason that the mines are at present working on much lower and richer levels than has ever been the case in the past. While this worthless slag overflows from the forehearth continuously to the waste dump, the low grade matte product accumulates in the forehearth of either form of apparatus, and it is from time to time tapped out, for further treatment in the secondary stage of my complete process, or in other words, in my secondary converter, for the elimination of its contained iron, on lines that result in profits, where all past and present practice outside of this method of treating ores, constitutes what is well known in the trade to be about the heaviest single item of expense in the cost of producing copper.

*Recovery of mineral values from flue-dust and fines.*—One of the many complex problems in present treatment processes is the recovery of mineral values from flue-dust and fines. Briqueting is usually resorted to, in an attempt to recover these values, but this has been found to be expensive and extremely inefficient and unsatisfactory. There is a radical difference between the flue-dust produced by the fumes or gases from the primary and secondary converters in my process of treating ores and that produced by the fumes or gases from a blast furnace, and either of which accumulates in the dust chambers. The former is a sulfate; it is white or gray in color; it is very fine in grain, and it is very rich in minerals, particularly in silver. The latter is an oxid. It is black in color; it is very coarse and gritty in texture, and it usually contains from 3½ to 5 per cent. of copper. Silver values in it, as a rule, are low. Both of these, when gathered from the dust chambers, are treated by me for the recovery of their contained mineral values in the same manner and in a way that is radically and fundamentally different from any present practice. My preferred method is to mingle any or all of these, as well as ore fines, in the low grade molten matte hereinbefore described, to the extent that it will absorb them without solidification, before this bath of molten matte has been delivered into the secondary converter of my system. The process is illustrated in the drawings of this application, Fig. 14. Another method of recovering values from flue dust or fines consists in placing a mass of these, as illustrated in Figs. 8 and 9, without any previous preparation, in an empty secondary converter, then running a layer of molten matte or slag, preferably the former, over them, in order to seal them securely to the bottom and to the interior side-walls of the vessel, and thereafter in running a body of molten matte into the vessel; thereafter blowing air into the molten bath and thus melting them down into liquid form by the heats of conversion, so that they are thus compelled to become a part of the molten bath. All their contained values are thus forced to join the molten bath, so that their values are recovered practically without loss or expense and at a single operation.

*Secondary or iron eliminating stage of the process.*—In molten form, the product of the primary converter, or of the blast furnace, as the case may be, is transferred from its respective forehearth, preferably by gravity, in suitable charges, into one or more secondary or iron removing converters of this system. The number of these will be governed by the size of the primary converter or of the blast furnace. It will be found profitable to charge each secondary converter with mineral bearing ores before the molten, low grade bath is delivered into it. As before stated, this molten bath now consists of iron, copper, gold, silver and sulfur. It is intensely basic (usually 67 per cent. iron) and silicious ore charges, preferably also preheated, as hereinbefore described, are fed into it while the converter is in full operation. Pure, unmineralized silica or quartz may be used for the separation of the iron from the matte, if preferred. It will form silicate of iron slags and it will eliminate the iron in the same manner that now prevails in present practice, through the continuous destruction of the silica lining of the converting vessel. It is, however, manifestly more profitable to use for this purpose highly silicious gold, silver or copper ores, because the addition of these will have the effect of materially adding to the mineral product, without cost.

In blast furnace smelting, it is a well known fact that an excess of silica in the charge exerts a decidedly chilling effect in the furnace, so that "crusts", "scaffolds" and "salamanders" result.

In my process the entering charge of highly silicious ore, or even of pure silica, has the effect of intensifying the internal heats in the converter. Even when the bath is comparatively cold, a charge of silicious ore will promptly restore its heat to incandescence. The ore charges dissolve almost instantly.

In the present method of treating, for instance, silver ores by crushing and water concentration, a loss in excess of 40 per cent. of the mineral contents universally prevails. In the treatment of gold quartz ores, a heavy loss also is inseparable from any form of concentration. In my present process it will be apparent that all such highly silicious quartz gold and silver ores can be utilized in the secondary stage, and while yielding up their mineral contents and thus adding to the profits of the work, their contained quartz serves the same purpose of forming silicate of iron slags and of eliminating the iron contents of the bath, as is now accomplished in the present expensive method of lining converters with crushed silica. Copper ores containing almost any, even very low percentages of silica may be utilized for the elimination of the iron. As a rule the less silica these ores contain, the more copper, gold or silver they will yield, and if the silica contents be low, it will be apparent that vastly greater tonnages can thus be melted and forced to yield up their mineral values, than if they contained heavy percentages of silica. Inasmuch, however, as the low silica ores can be smelted by means of their own natural fuels in the primary converter or in the blast furnace, with little coke, it will be found better practice to divide the total tonnage from the mines into two classes, to wit: one containing low percentages of silica, for use in the primary converter or in the blast furnace, and the other containing high percentages of silica, for use in the secondary converter. The latter highly silicious ore that can be dissolved in the secondary stage of this process, will approximate from ten to fifteen per cent. of the total ore tonnage from the mines. It will be apparent that in this secondary stage of my process, all such highly silicious ores as have heretofore been passed through water concentrators can be made to yield up their values without expense and that thus highly silicious ores which were troublesome in the primary converter or in the blast furnace may be easily handled in the secondary converter. The iron in the bath, which now constitutes such a heavy expense to eliminate, in the production of copper, is in this process forced to serve a useful purpose, by dissolving value bearing ores, fines and flue-dust, while forming silicate of iron slags. The converter slags thus produced vary in mineral contents. As long as the ore-feed continues these may run quite low, say as low as ¾ per cent. When it ceases and the bath is rapidly nearing the grade of white metal, they become constantly greater and may amount to 3½ per cent., or even more. Without regard to their tenor, all such are transferred, in molten form, and delivered into either the ore-feed end of the primary converter, through an aperture provided for that purpose, or into the blast furnace, at the end farthest removed from the overflow-spout, as the case may be. In their subsequent travel through the primary converter or through the blast furnace and thereafter through the entire length of a forehearth, these slags are cleansed, without expense, to the same degree as hereinbefore described; or in other words, to approximately the one-twentieth of one per cent.

In operating the secondary converter, the matte is first enriched to the grade of white metal, or say to 76½ per cent. copper; or in other words, to the point where all iron has been eliminated, with the full blast on. At this stage of the process the ore-feed is stopped and the blast is preferably modified down to the limit that will hold the molten bath out of the twyers, during the process of expelling the remaining sulfur, arsenic, bismuth or such like impurities. If objectionable impurities, such as bismith exist in the bath, it will be found necessary to overblow and produce suboxid by overblowing, in order to completely expel these.

Carbonates, oxids, scrap copper, converter, furnace or ladle linings or skulls and all similar mineral bearing material may be fed into the secondary converter at will, for the economical recovery of contained mineral values.

*Construction of apparatus.*—The service on both the primary and on the secondary converters is very severe, because the low grade matte treated in each consists of excessively corrosive elements. Special apparatus has been provided to withstand this intense service. It will be noted that each vessel is practically indestructible, ordinary wear and tear excepted. Each remains uniform and constant in size, because a silica lining is not depended upon as a fluxing medium for removing the iron contents of the matte. The delays, the extra shells and the cost of silica flux, together with the heavy expenses of crushing and ramming, are avoided.

My preferred form of apparatus for both the primary and the secondary converters is that shown in the drawings, and the details of the construction of which will at once be apparent to those skilled in the art. The flat metal ribs containing water-pipes are very cheap and are made preferably of mild, soft, openhearth steel castings, so that breaking or cracking or splitting in them is impossible. They are made relatively thin and in proportion to the diameter of the water-pipes, partly for the purpose of reducing the weight and the cost of the apparatus, but principally to make it possible to cast tubes in them, which would otherwise be impossible, as these would be dissolved or crushed if a heavy body of metal were used. Each vessel contains a basic lining and the flow of water through the ribs may be regulated and adjusted at will, so that an absolute limit is thus placed on the destruction of such basic lining by corrosion from the molten bath, exactly as is now the case in a water-jacketed forehearth that is lined with a refractory of some description.

Figs. 8 and 9 represent the secondary converter provided with a water-cooled, solid metal top. This is for the purpose of illustrating different methods of construction. I have not found it necessary or desirable in my work to water-cool the top or nose of the converter.

The construction illustrated in Figs. 1 and 3 I have found, after eight months' test, to be excellent for the purpose and economical in practice. Its top or throat is made of one or more solid steel castings and it works perfectly, without any lining whatever. The practical manager will appreciate the fact that this solid metal nose or throat will save much delay, inconvenience and expense when compared with the silica lined tops now universally used. In addition to this form of rib construction, I have used successfully for the purpose apparatus composed of heavy metal blocks, without water-pipes, as well as other forms. I have found, however, as a result of all of my tests, that the construction with thin water-pipe ribs, herein illustrated, is the cheapest and best, for many reasons that need not here be given in detail.

Attention is called to the fact that this secondary stage of my process may also be successfully practiced in a common, silica-lined converter. Fairly good and economical results are obtainable, particularly when a barren, crushed silica lining is utilized and where mineral bearing sulfid ores are first placed in the empty converter, before the molten matte is delivered into it and thereafter are fed into the molten bath during the bessemerizing process. It has been found in practice that the iron of the molten bath seeks the point of least resistance and therefore attacks the ore delivered into the molten bath much more rapidly than it attacks the lining. The reason will be apparent to those skilled in the art. Each separate piece of ore is entirely surrounded by molten matte and inasmuch as it contains minerals and occluded particles of sulfid, arsenid and antimonid, it is more susceptible to attack and to corrosion from the molten bath. In the case of the barren lining, it is a pure quartz; as a rule it contains no occluded particles of sulfid, arsenid and antimonid, and in any event it is only possible for the molten bath of matte to attack it on one compacted side alone.

In some instances, mineral bearing ores, such as those from the Snowstorm mine in Idaho, from the St. Gertrude mine in Mexico, and from the Spring Hill mines near Helena, Montana, are crushed and are used as silica linings; but these ores are and can only be used for the purpose, because they contain less than one per cent. of sulfur. It has been found in practice that the life of these silica linings is increased 20 per cent. by practicing the secondary stage of my process in such converters, because of the reasons hereinbefore given; but it will be manifest to those skilled in the art that a permanent vessel containing a basic lining and provided with outside cooling influences, capable of placing an absolute limit on the destruction of the lining, is preferable and is far more economical than the use of any form of silica lined converter, and that it will admit of producing copper at a lower cost than where silica linings are used. In my work at Butte, I made copper continuously day and night for a period of eight months, and during all of this time I utilized only one single basic lining. This was as perfect at the end of an eight months' run as it was at the commencement of my work, with the single exception of a line immediately above the twyers. In this converter I utilized the heavy block construction and I found by my tests that while the whole body of the lining was intact, generally speaking over the interior surface of this vessel the corrosive action was so rapid immediately above the twyers, that at this point a greater cooling action was demanded, in order to retain the permanent integrity of that portion of the lining.

Many unsuccessful attempts have been made in the past to use the common steel shell converter, provided with a basic lining instead of the ordinary crushed silica lining. Any form of basic lining is expensive. The original cost is great and no one can afford to use it unless it is guaranteed a long life in service. If a common steel shell converter be used, in combination with a basic lining, it has been found after repeated tests that the destruction of this lining through corrosion from the molten bath is so rapid as to make the use of a basic lining in this way commercially impossible. My tests have proven that a sufficient restraining influence on the outside of this basic lining must at all times be exerted so as to place an absolute limit on this internal corrosive action. While the solid block construction has proven in eight months' test to be ample to accomplish this purpose, excepting immediately above the blast entrance, there are many objections to the use of these heavy metal blocks. For instance, this form of construction is very expensive, the apparatus is very heavy and unwieldy, and unless the cooling influence of the heavy blocks be supplemented at or near the blast entrance with water-cooled blocks, the lining will soon be destroyed at this one point in the vessel. I much prefer the light, steel rib construction, fitted with water-cooling pipes, as illustrated in the drawings, because the cooling action can then be regulated at will and an absolute limit can thus be placed at all times on the destruction of the basic lining through the corrosion of the molten bath. In apparatus of this construction it is possible to make one basic lining practically indestructible.

When the point has been reached, in refining the molten bath, that blister copper results, and when it is important to retain the internal heats, I shut off the flow of water through the pipes entirely and I allow the outside shell to heat up, even to the point where the water in the pipes may be at a boiling temperature. No harm from this practice can result, as I have proven in a long series of tests, because the overflow for the waste water is placed so high that it cannot evaporate rapidly enough to empty any portion of the pipes and thus cause damage from overheating. During this period, no cooling action on the interior of the vessel, or on the molten copper bath, can occur.

*Refining process and furnace.*—When clean blister copper has thus been produced, presumably containing a small percentage of suboxid, through expelling bismuth, selenium, tellurium, arsenic, or other impurities, the remaining small bath, amounting perhaps to three or four tons, representing a single charge product, is transferred into a very small, convenient refining furnace of special design, as illustrated in the drawings, Figs. 10, 11, 12 and 13. This vessel is provided with heavy heat-retaining walls.
Preferably it has a pure silica brick lining. It is a permanent apparatus and constant in size, because there is now no iron in the bath to attack the silica lining. It has an oil or gas flame, that plays above the level of the molten bath and which is capable of producing and maintaining indefinitely a silver white incandescent heat. The interior of the vessel is pre-heated by it to incandescence before the single small charge of blister copper is delivered into it, and it heats up, liquefies and holds this very small bath at any desired temperature for as long a period as may be desired. This method of refining copper in small batches, as a continuous process, in molten form direct from the converters is in marked contrast with all prevailing practice and will commend itself to the practical manager. The refining of the molten copper bath is accomplished by forcing into it, by means of a force-pump, precreated, hydrocarbon gases, preferably produced from cheap, waste wood or ligneous material of any kind. Saw-dust may also be injected into the molten copper as a reducing gas producing medium. Refining may also be done, either temporarily or regularly in this furnace, by hand-poling, as is now commonly practiced. This furnace is similar in design to a converter. The hydrocarbon gases are delivered into the bath, preferably through four or more small twyers, similar to those used in bessemerizing with an oxidizing blast. The vessel is capable of being tipped by power, both for receiving and for pouring the bath; hence no trouble with a tap-hole occurs, because no tap-hole is necessary or desirable in this form of apparatus. The reducing action may be started or stopped in an instant and the apparatus and refining process is controlled and operated by one man with an exactness and precision such as cannot be even approximated in any form of furnace at present used to accomplish the same result. The cost of remelting is avoided. When blister copper is to be treated electrolytically for the separation of contained precious metals, this refining process is not used, because the elimination of suboxid is then accomplished electrolytically.

It will be apparent that this complete process covers and is capable of extracting the mineral values from the entire range of copper, gold and silver ores, of whatever nature and kind, with but few of the expenses or mineral losses that now universally prevail. Sulfids, arsenids, antimonids, carbonates, silicates, oxids, cuprite, tetrahedrite, chalcocite, scrap copper, linings, skulls, furnace bottoms, converter slags, concentrates, highly silicious copper, gold or silver ores and pure silica can be reduced, either in the primary or in the secondary stages of the process, with absolutely minimum losses and at costs that will usually not exceed the one-half and which will never exceed the two-thirds of any present practice. Nickel and cobalt ores and many others may also be successfully treated by it.

At a mine that contains ores that are rich in natural fuels, the entire recovery can be accomplished with a smelting plant consisting of a primary or metalloid eliminating converter and a secondary or iron eliminating converter. At a mine that contains silicious ores, the entire recovery can be accomplished with a smelting plant consisting of a blast furnace for the first fusion and a secondary converter for eliminating iron. Each unit can be designed to treat 600 tons of ore daily, or more, if preferred, and such units may be added to a smelter plant indefinitely without changing or disturbing the portion already in operation.

On some large mining properties, both silicious ores and sulfids rich in natural fuels are found. In other properties the character of the ores produced is constantly changing from highly silicious into sulfids. In such cases I would recommend a smelter plant equipped with a blast furnace, a primary converter, and a secondary converter. The cost of coke could then be eliminated until the silicious nature of the ores demanded its use. The product of a mine could in many cases be sorted into highly silicious and sulfids and all of the latter smelted without the cost of coke, in the primary converter. In any event, from ten to fifteen per cent. of the most highly silicious product of the mine is naturally reserved for use in the secondary stage of the process.

It is believed that such treatment plants represent the absolute limits of simplicity and economy, both in first cost and in regular daily cost of operation.

In developing and perfecting this process, many series of tests have been conducted by me, many underlying or possibly conflicting patents have been purchased and an enormous sum of money, in short a fortune, has been expended.

Referring now to the drawings (Figs. 1, 2 and 3), 2 is the primary converter, having riding rings 3 on which the vessel may be inverted for the purpose of emptying it in the event of a stoppage from any cause. 4 is the outside body or shell of the vessel. 5 represents the interior basic lining, preferably composed of blocks or bricks of refractory material, such as magnesite. 6 are the water-pipes for circulating the cooling medium for the mains 7 and 8. 9 is the throat or nose of the vessel for the escape of hot gases, and through which molten contents are emptied by inverting the vessel in the event of a stoppage. 10 is a telescopic extension of the stack that can be raised and lowered so as to exclude the outside air. 11 represents means for opening the stack so as to bar down any accretions that may be deposited on the interior by the escaping gases. 21' is the ore-feed opening. 25 is the overflow spout located in the axis of the vessel farthest removed from the ore feed. 26 illustrates a metal drop tube for excluding the outside air as soon as the congealed slag covering 27 and 29 has formed a junction at 30 with the metal drop tube. 28 illustrates an opening in the drop tube so that the furnace-man may from time to time examine and rod the spout, and thus if necessary remove any chilled accretions. 31 illustrates the overflow spout for the worthless slag from the forehearth. It may be thence removed to the dump by means of the slag car 32, or otherwise. 33 illustrates a bridge on which the furnace-man may stand while tending the overflow spout.

Figs. 4 and 5 illustrate a fixed converter for eliminating the metalloids. It can be substituted for the apparatus of Fig. 1, and is especially designed for the treatment of very refractory ores that may demand a longer travel while submerged in the molten bath, in order to melt them.

In Figs. 6 and 7, which illustrate a form of preheater together with dust chamber which may be utilized in conjunction with my apparatus, 12 illustrates the flue or passage for the hot gases. 13 and 14 illustrate chambers through which the ores are passed in order to dry them and to preheat them somewhat before their delivery into the smelting converter. 15, 16 and 17 illustrate the means for propelling the ore while subjected to the drying process after it is delivered into the preheater at 18 by means of a "challenge" ore feeder, or by any other desired means, and until its delivery into the ore feed tube or channel illustrated at 20 and 21. At 19 in Fig. 6 the ore drops from the upper level in the preheater down onto the lower level, and its travel is then reversed by the action of the rabbles or plows. 22 illustrates the dust chambers, which may be of any desired form or construction. 23 illustrates bottom gates for the removal of any accumulation of flue dust.

Figs. 8 and 9 show my secondary or iron-eliminating converter, the construction being preferably similar to that shown in Fig. 1. In these figures I illustrate a method of recovering mineral values from flue dust or fines which are banked in a mass 39 upon the converter lining and held thereon by a layer of matte or slag 40. 41 illustrates a water-jacketed throat or nose, which may be used if preferred, and is shown for the purpose of illustrating different forms of construction. 43 illustrates a spout for delivering continuous charges of highly silicious mineral bearing ores into the bath of low grade matte. By this means, at a profit, I am enabled to form silicate of iron slags, and thus eliminate the useless contents of the bath.

In Figs 10 and 11, 44 illustrates the refining furnace, and 45 is a heavy metal nose or throat. 46 is a relatively thin silicious lining, preferably composed of a good quality of brick or tile. 47 is an oil or gas burner for producing and maintaining any desired temperature within the interior of the vessel—say to 2400 degrees F. 48 is a swinging door. 49 is a tube for the delivery into the vessel of precreated hydrocarbon gases. 50, in Fig. 11, illustrates a cross-section of the wind-box, as well as one twyer for the delivery of the precreated hydrocarbon gases underneath the bath of molten copper for refining it by removal of the sub-oxid.

51 in Figs. 12 and 13 illustrates a hopper for the delivery of saw-dust into the chamber 52. After the saw-dust has been dumped from the car 53, into the hopper 51, the valve 54 may be opened and the saw-dust allowed to drop by gravity into the hopper 52. The latter will hold sufficient saw-dust to refine two complete molten baths, or approximately eight tons. After the valve 54 has been closed, pressure is delivered on top of the saw-dust contained in 52 by means of a pipe 55, by means of which pressure it is forced through the twyers underneath the molten bath of copper, as heretofore described.

Referring to Fig. 14, flue dust or fines without any briqueting or previous preparation are delivered in crude state into the hopper 56. They are from time to time allowed to pass through the gate or valve 57 into the feed pipe 58. The lower portion 58 is preferably telescopic, and it can be raised, lowered and adjusted at 59 by means of regulating devices or handles shown at 60. As the low grade matte flows from the forehearth through the trough or conductor 61, into the ladle or other vessel 62, it forms a cup or depression because of its great weight at the point in the body of molten matte shown at 63. I have found that by carefully adjusting a stream of flue dust or fine ore, as illustrated at 64, so that it will shoot underneath of this stream of falling molten matte, the matte carries the flue dust or fines continuously down with it into the main body of molten matte in the ladle, so that the flue dust and fines are thus thoroughly and automatically mingled completely through the body of molten matte. It is important that the proportion of flue dust or fines thus fed into the low grade molten matte, before its delivery into the secondary converter, shall not be sufficient to cause solidification, otherwise it would become necessary to incur the expense of remelting this, either in a blast furnace or in the primary converter.

I claim:—

1. The method of extracting copper, gold, silver and other metals from ores, which consists in the following steps: dissolving or melting ores that contain within themselves oxidizable elements, by submergence in a molten bath of matte and by the heat of oxidation produced by forcing air through the same, and eliminating the silica, alumina and lime; then separating the slag from the low grade matte, then transferring the matte into a converter, oxidizing it therein, adding value-bearing silicious ore, and forming thereby silicate of iron slags, and then eliminating residual oxidizable impurities by forcing air into the bath; substantially as herein described.

2. The method of extracting copper, gold, silver and other metals from ores, which consists in the following steps; dissolving or melting dried and preheated ores that contain within themselves oxidizable elements, by submergence in a molten bath of matte and by the heat of oxidation produced by forcing air through the same, and eliminating the silica, alumina and lime; then separating the slag from the low grade matte, then transferring the matte into a converter, oxidizing it therein, adding value-bearing silicious ore, and forming thereby silicate of iron slags, and then eliminating residual oxidizable impurities by forcing air into the bath; substantially as herein described.

3. The method of extracting copper, gold, silver and other metals from ores, which consists in the following steps: dissolving or melting ores that contain within themselves oxidizable elements, by submergence in a molten bath of matte and by the heat of oxidation produced by forcing air through the same, and eliminating the silica, alumina and lime; then separating the slag from the low grade matte, then transferring the matte, together with commingled flue dust or fines, into a converter, oxidizing it therein, adding value-bearing silicious ore, and forming thereby silicate of iron slags, and then eliminating residual oxidizable impurities by forcing air into the bath; substantially as herein described.

4. The method of extracting copper, gold, silver and other metals from ores, which consists in the following steps: dissolving or melting ores that contain within themselves oxidizable elements, by submergence in a molten bath of matte and by the heat of oxidation produced by forcing air through the same, and eliminating the silica, alumina and lime; then separating the slag from the low grade matte, then transferring the matte into a converter, oxidizing it therein, adding value-bearing silicious ore, and forming thereby silicate of iron slags, then eliminating residual oxidizable impurities by forcing air into the bath, and returning to the first-named converter, slags from the second converter for cleansing the same and recovering contained mineral values; substantially as herein described.

5. The method of extracting copper, gold, silver and other metals from ores, which consists in the following steps: dissolving or melting ores that contain within themselves oxidizable elements, by submergence in a molten bath of matte and by the heat of oxidation produced by forcing air through the same, and eliminating the silica, alumina and lime; then separating the slag from the low grade matte, then transferring the matte into a converter, oxidizing it therein, adding value-bearing silicious ore and forming thereby silicate of iron slags, then eliminating residual oxidizable impurities by forcing air into the bath; transferring the blister copper thus produced into a refining furnace, and refining it therein; substantially as herein described.

6. The method of extracting copper, gold, silver and other metals from natural ores, which consists of the following steps: separating such ores into two distinct classes, approximating 10 or 15 per cent. of the most highly silicious ores of the mine product and 85 or 90 per cent. of such ores as are the lowest in silica content, melting the latter ores for the elimination only of the contained silica, alumina and lime, without substantial concentration, separating the slag from the matte, feeding the highly silicious ore into the matte as a means of separating the iron contents of the matte through the formation of silicate of iron slags, and then removing the remaining sulfur, arsenic, bismuth or such impurities by oxidation through an air-blast; substantially as described.

In testimony whereof, I have hereunto set my hand.

RALPH BAGGALEY.

Witnesses:
THOMAS W. BAKEWELL,
GEORGE H. SONNEBORN.